US011702920B1

(12) United States Patent
Mao et al.

(10) Patent No.: US 11,702,920 B1
(45) Date of Patent: Jul. 18, 2023

(54) FRACTURING CONTROL METHOD AND FRACTURING SYSTEM

(71) Applicant: YANTAI JEREH PETROLEUM EQUIPMENT & TECHNOLOGIES CO., LTD., Yantai (CN)

(72) Inventors: Zhuqing Mao, Yantai (CN); Haiping Xing, Yantai (CN); Shouzhe Li, Yantai (CN); Liang Li, Yantai (CN); Kaishen Liu, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/949,978

(22) Filed: Sep. 21, 2022

Related U.S. Application Data

(63) Continuation-in-part of application No. PCT/CN2022/101178, filed on Jun. 24, 2022.

(51) Int. Cl.
*E21B 43/26* (2006.01)
*E21B 21/08* (2006.01)

(52) U.S. Cl.
CPC .......... *E21B 43/2607* (2020.05); *E21B 21/08* (2013.01); *E21B 43/26* (2013.01)

(58) Field of Classification Search
CPC ....... E21B 43/2607; E21B 21/08; E21B 43/26
See application file for complete search history.

(56) References Cited

U.S. PATENT DOCUMENTS

| | | | |
|---|---|---|---|
| 599,804 A | 3/1898 | Short | |
| 3,788,775 A | 1/1974 | Leutner et al. | |
| 11,408,417 B1 * | 8/2022 | Stephenson | F04B 23/06 |
| 11,549,506 B2 * | 1/2023 | Harvell | E21B 41/0085 |
| 2017/0115674 A1 * | 4/2017 | Lopez | E21B 43/2607 |
| 2019/0316447 A1 * | 10/2019 | Oehring | E21B 41/0085 |
| 2020/0263525 A1 * | 8/2020 | Reid | F04B 49/06 |

(Continued)

FOREIGN PATENT DOCUMENTS

| | | |
|---|---|---|
| CN | 102032167 A | 4/2011 |
| CN | 103470485 A | 12/2013 |

(Continued)

OTHER PUBLICATIONS

First Search for Chinese Application No. 202110318395.X dated Jul. 28, 2022.

(Continued)

*Primary Examiner* — James G Sayre

(57) ABSTRACT

A fracturing control method is applied to a fracturing system including a plurality of fracturing pump sets. The method includes: turning on a first fracturing pump set according to a total required output of the fracturing system and priorities of the plurality of fracturing pump sets; adjusting an operating parameter of the first fracturing pump set according to an actual output of the first fracturing pump set and an output threshold corresponding to the first fracturing pump set, so that the actual output of the first fracturing pump set is f1 times the output threshold; and if the operating output of the first fracturing pump set is less than the total required output, turning on a second fracturing pump set, a priority of the second fracturing pump set being lower than a priority of the first fracturing pump set.

20 Claims, 3 Drawing Sheets

(56) References Cited

U.S. PATENT DOCUMENTS

| | | | | |
|---|---|---|---|---|
| 2021/0025382 | A1* | 1/2021 | Harvell | H02J 13/00004 |
| 2021/0040830 | A1* | 2/2021 | Mu | F04B 49/007 |
| 2022/0178235 | A1* | 6/2022 | Zhang | F04B 49/065 |
| 2022/0307359 | A1 | 9/2022 | Liu et al. | |
| 2023/0003111 | A1* | 1/2023 | Yeung | F04B 23/04 |

FOREIGN PATENT DOCUMENTS

| | | | | |
|---|---|---|---|---|
| CN | 203409994 | U | 1/2014 | |
| CN | 104265473 | A | 1/2015 | |
| CN | 104536368 | A | 4/2015 | |
| CN | 105965319 | A | 9/2016 | |
| CN | 107237617 | A | 10/2017 | |
| CN | 107544304 | A | 1/2018 | |
| CN | 107605873 | A | 1/2018 | |
| CN | 108442912 | A | 8/2018 | |
| CN | 108506707 | A | 9/2018 | |
| CN | 108757415 | A | 11/2018 | |
| CN | 210003481 | U | 1/2020 | |
| CN | 211950463 | U | 11/2020 | |
| CN | 112283088 | A | 1/2021 | |
| CN | 112311299 | A | 2/2021 | |
| CN | 112324615 | A | 2/2021 | |
| CN | 112412426 | A | 2/2021 | |
| CN | 212614660 | U | 2/2021 | |
| CN | 112983798 | A | 6/2021 | |
| DE | 2111359 | A1 | 9/1972 | |
| JP | 2006336842 | A | 12/2006 | |
| WO | WO-2017048543 | A1 * | 3/2017 | B64C 39/024 |

OTHER PUBLICATIONS

Written Opinion of the International Searching Authority and International Search Report for PCT Application No. PCT/CN2021/102406 dated Dec. 30, 2021 with partial English machine translation.

* cited by examiner

FRACTURING CONTROL METHOD AND FRACTURING SYSTEM

CROSS-REFERENCE TO RELATED APPLICATION

This application is a continuation-in-part Application of International Patent Application No. PCT/CN2022/101178 filed on Jun. 24, 2022, which is incorporated herein by reference in the entirety.

TECHNICAL FIELD

The present disclosure relates to the field of oil and gas field fracturing technology, and in particular, to a fracturing control method and a fracturing system.

BACKGROUND

At present, fracturing operation is an effective measure commonly used in oil fields for increasing production, and is also a main method for exploiting unconventional oil and gas. For example, when the production of an oil well reaches a certain stage, the production capacity and permeability will decrease. In order to enhance the oil discharge capacity and increase the production of the oil wells, fracturing operations are usually performed.

The fracturing operation is to create artificial cracks in the strata, so as to improve the flow of oil in the underground formations and increase the production of the oil wells. Fracturing plays an important role in improving the flow conditions at the bottom of the oil wells, mitigating interlayer interference and improving the production state of the oil layer. With the continuous development of fracturing processes and technologies, large-scale industrial fracturing operations on large platforms and ultra-deep wells have become very common.

SUMMARY

In an aspect, a fracturing control method is provided. The fracturing control method is applied to a fracturing system including a plurality of fracturing pump sets. The method includes: firstly, obtaining a total required output of the fracturing system; secondly, turning on a first fracturing pump set according to the total required output and priorities of the plurality of fracturing pump sets; thirdly, adjusting an operating parameter of the first fracturing pump set according to an actual output of the first fracturing pump set and an output threshold corresponding to the first fracturing pump set, so that the actual output of the first fracturing pump set is an operating output, the operating output being f1 times the output threshold; then, when the operating output of the first fracturing pump set is less than the total required output, turning on a second fracturing pump set, the plurality of fracturing pump sets including the first fracturing pump set and the second fracturing pump set, and a priority of the second fracturing pump set being lower than a priority of the first fracturing pump set.

In some embodiments, each fracturing pump set includes a plurality of fracturing pumps; and turning on the first fracturing pump set includes: simultaneously turning on the plurality of fracturing pumps in the first fracturing pump set, or, sequentially turning on each fracturing pump in the first fracturing pump set.

In some embodiments, adjusting the operating parameter of the first fracturing pump set according to the actual output of the first fracturing pump set and the output threshold corresponding to the first fracturing pump set, so that the actual output of the first fracturing pump set is the operating output, the operating output being f1 times the output threshold v, includes: when the actual output of the first fracturing pump set is greater than or equal to the output threshold corresponding to the first fracturing pump set, adjusting the operating parameter of the first fracturing pump set, so that the actual output of the first fracturing pump set is the operating output, the operating output being f1 times the output threshold, and f1 being greater than or equal to 0.8 and less than 1 ($0.8 \le f1 < 1$).

In some embodiments, the fracturing control method further includes: firstly, obtaining a sum of actual outputs of at least one fracturing pump set in an on state in the plurality of fracturing pump sets; and then, when the sum of the actual outputs of the at least one fracturing pump set in the on state is greater than or equal to the total required output, no longer turning on a fracturing pump set in an off state.

In some embodiments, the first fracturing pump set includes a plurality of fracturing pumps. The method further includes: obtaining an amount of energy consumed by at least one fracturing pump that is turned on in the first fracturing pump set; and when the amount of energy consumed by the at least one fracturing pump that is turned on in the first fracturing pump set is greater than or equal to an energy threshold corresponding to the first fracturing pump set, turning off the at least one fracturing pump that is turned on in the first fracturing pump set.

In some embodiments, different fracturing pump sets in the plurality of fracturing pump sets have different priorities.

In some embodiments, the priority is used to determine the order of turning on the plurality of fracturing pump sets; the lower the energy cost of one of the plurality of fracturing pump sets, the higher the priority of this fracturing pump set, and the earlier this fracturing pump set is turned on; the higher the energy cost of one of the plurality of fracturing pump sets, the lower the priority of this fracturing pump set, and the later this fracturing pump set is turned on.

In some embodiments, the fracturing control method further includes: setting a priority of each fracturing pump set according to an energy cost of each fracturing pump set in the plurality of fracturing pump sets.

In some embodiments, an energy cost of the first fracturing pump set is lower than an energy cost of the second fracturing pump set.

In another aspect, a non-transitory computer-readable storage medium is provided. The non-transitory computer-readable storage medium has stored thereon computer program instructions that, when run on a computer, cause the computer to perform the fracturing control method as described in any one of the above embodiments.

In yet another aspect, a computer program product is provided. The computer program product includes computer program instructions stored on a non-transitory computer-readable storage medium. When executed on a computer (e.g., a fracturing system), the computer program instructions cause the computer to perform the fracturing control method as described in any one of the above embodiments.

In yet another aspect, a computer program is provided. When executed on a computer (e.g., a fracturing system), the computer program causes the computer to perform the fracturing control method as described in any one of the above embodiments.

In yet another aspect, a fracturing system is provided. The fracturing system includes a plurality of fracturing pump sets and a fracturing control device. The fracturing control device is coupled to the plurality of fracturing pump sets. The fracturing control device is configured to: firstly, obtain a total required output of the fracturing system; secondly, turn on a first fracturing pump set according to the total required output and priorities of the plurality of fracturing pump sets; thirdly, adjust an operating parameter of the first fracturing pump set according to an actual output of the first fracturing pump set and an output threshold corresponding to the first fracturing pump set, so that the actual output of the first fracturing pump set is an operating output, the operating output being f1 times the output threshold; and then, when the operating output of the first fracturing pump set is less than the total required output, turn on a second fracturing pump set, the plurality of fracturing pump sets including the first fracturing pump set and the second fracturing pump set, and a priority of the second fracturing pump set being lower than a priority of the first fracturing pump set.

In some embodiments, each fracturing pump set includes a plurality of fracturing pumps; the fracturing control device is further configured to: simultaneously turning on the plurality of fracturing pumps in the first fracturing pump set, or, sequentially turning on each fracturing pump in the first fracturing pump set.

In some embodiments, the fracturing control device is configured to: when the actual output of the first fracturing pump set is greater than or equal to the output threshold corresponding to the first fracturing pump set, adjust the operating parameter of the first fracturing pump set, so that the actual output of the first fracturing pump set is the operating output, the operating output being f1 times the output threshold, and f1 being greater than or equal to 0.8 and less than 1 ($0.8 \le f1 < 1$).

In some embodiments, the fracturing control device is further configured to: obtain a sum of actual outputs of at least one fracturing pump set in an on state in the plurality of fracturing pump sets; and when the sum of the actual outputs of the at least one fracturing pump set in the on state is greater than or equal to the total required output, no longer turn on a fracturing pump set in an off state.

In some embodiments, the first fracturing pump set includes a plurality of fracturing pumps. The fracturing control device is further configured to: obtain an amount of energy consumed by at least one fracturing pump that is turned on in the first fracturing pump set; and when the amount of energy consumed by the at least one fracturing pump that is turned on in the first fracturing pump set is greater than or equal to an energy threshold corresponding to the first fracturing pump set, turn off the at least one fracturing pump that is turned on in the first fracturing pump set.

In some embodiments, the fracturing control device is further configured to: set a priority of each fracturing pump set according to an energy cost of each fracturing pump set in the plurality of fracturing pump sets.

In some embodiments, different fracturing pump sets in the plurality of fracturing pump sets have different priorities.

In some embodiments, the priority is used to determine the order of turning on the plurality of fracturing pump sets; the lower the energy cost of one of the plurality of fracturing pump sets, the higher the priority of this fracturing pump set, and the earlier this fracturing pump set is turned on; the higher the energy cost of one of the plurality of fracturing pump sets, the lower the priority of this fracturing pump set, and the later this fracturing pump set is turned on.

In some embodiments, an energy cost of the first fracturing pump set is lower than an energy cost of the second fracturing pump set.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely the accompanying drawings of some embodiments of the present disclosure, and a person of ordinary skill in the art may obtain other drawings according to these drawings. In addition, the accompanying drawings in the following description may be regarded as schematic diagrams, and are not limitations on actual size of products, actual processes of methods and actual timings of signals involved in the embodiments of the present disclosure.

DETAILED DESCRIPTION

Figure 1:
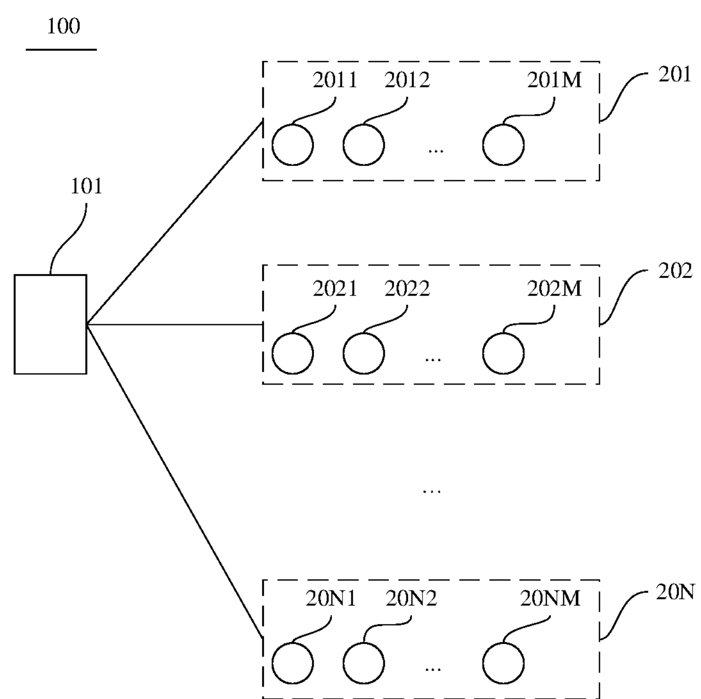
FIG. 1 is a structural diagram of a fracturing system, in accordance with some embodiments.

The technical solutions in some embodiments of the present disclosure will be described clearly and completely below with reference to the accompanying drawings. Obviously, the described embodiments are merely some but not all of embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials, or characteristics described herein may be included in any one or more embodiments or examples in any suitable manner.

Hereinafter, the terms "first" and "second" are only used for descriptive purposes, and cannot be construed as indicating or implying the relative importance or implicitly indicating the number of indicated technical features. Therefore, the features defined with "first" and "second" may explicitly or implicitly include one or more of the features. In the description of the embodiments of the present disclosure, the term "a/the plurality of" means two or more unless otherwise specified.

In the description of some embodiments, the term "coupled", "connected" and their derivatives may be used. For example, the term "connected" may be used when describing some embodiments to indicate that two or more components are in direct physical or electrical contact with each other. For another example, the term "coupled" may be used when describing some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B, and C" has a same meaning as the phrase "at least one of A, B, or C", and both include the following combinations of A, B, and C: only A, only B, only C, a combination of A and B, a combination of A and C, a combination of B and C, and a combination of A, B, and C.

The use of the phrase "applicable to" or "configured to" herein indicates an open and inclusive expression, which does not exclude devices that are applicable to or configured to perform additional tasks or steps.

In addition, the phrase "based on" used herein has an open and inclusive meaning, since a process, step, calculation or other action that is "based on" one or more of the stated conditions or values may, in practice, be based on additional conditions or values beyond those stated.

Exemplary embodiments are described herein with reference to sectional views and/or plan views as idealized exemplary drawings. In the accompanying drawings, thicknesses of layers and regions may be enlarged for clarity. Therefore, variations in shape with respect to the drawings due to, for example, manufacturing technology and/or tolerances may be envisaged. Therefore, the exemplary embodiments should not be construed as being limited to the shapes of the regions as illustrated herein, but including deviations in shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

Generally, during an industrial fracturing operation, dozens of fracturing pumps form a fracturing pump set to complete the fracturing operation together with other supporting equipment. The dozens of fracturing pumps may be diesel driven, electric driven, or turbine driven. During the industrial fracturing operation, fracturing systems of different driving modes may operate in the same well. For example, an electric-driven fracturing pump and a diesel-driven fracturing pump may operate in the same well. During the operation, in order to reduce the energy cost while meeting the total required output, the staff at the site need to decide on a control manner of the fracturing pumps of various driving modes according to the total required output, the outputs of the fracturing pumps, the energy costs of different driving modes, and other parameters, and manually turn on the fracturing pumps. Therefore, industrial fracturing operations require human judgment and manual operation, resulting in a low efficiency.

For this purpose, embodiments of the present disclosure provide a fracturing system. As shown in FIG. 1, the fracturing system 100 includes a fracturing control device 101 and a plurality of fracturing pump sets. Of the plurality of fracturing pump sets, each fracturing pump set includes a plurality of fracturing pumps.

In some embodiments, the number of fracturing pumps included in different fracturing pump sets of the plurality of fracturing pump sets may be the same or different. The number of the fracturing pump sets included in the fracturing system 100 and the number of the fracturing pumps included in each fracturing pump set are not limited in the present disclosure. The following embodiments are described by taking an example where the fracturing system 100 includes N fracturing pump sets (e.g., the fracturing pump set 201, the fracturing pump set 202, . . . , the fracturing pump set 20N in FIG. 1), and each fracturing pump set includes M fracturing pumps (e.g., the fracturing pump set 201 includes the fracturing pump 2011, the fracturing pump 2012, . . . , the fracturing pump 201M). N is an integer greater than or equal to 2, and M is an integer greater than or equal to 2.

Each fracturing pump set corresponds to a single driving mode. That is, the M fracturing pumps in each fracturing pump set are of the same driving mode. The driving modes corresponding to different fracturing pump sets may be the same or different. The following embodiments will be described by taking an example where different fracturing pump sets correspond to different driving modes. The driving modes include but are not limited to diesel driven, electric driven, and turbine driven.

The fracturing control device 101 is coupled to N fracturing pump sets to control the on and off states of each fracturing pump in each fracturing pump set. The coupling manner between the fracturing control device 101 and the N fracturing pump sets may be such that the fracturing control device 101 is coupled to the controller of each fracturing pump set, or the fracturing control device 101 is coupled to the controller of each fracturing pump in each fracturing pump set. The coupling manner between the fracturing control device 101 and the plurality of fracturing pump sets is not limited in the present disclosure.

The fracturing control device 101, the controller of each fracturing pump set, or the controller of each fracturing pump in each fracturing pump set may be or include, for example, a processor. The processor may be or include, for example, a central processing unit (CPU), a microprocessor, an application specific integrated circuit (ASIC), a chip, or a programmable logic device (such as a field programmable gate array (FPGA)).

In some embodiments, different fracturing pump sets in the N fracturing pump sets have different priorities, and the priority of each fracturing pump set may be set according to the energy cost of the fracturing pump set. This priority is used to determine the order of turning on the N fracturing pump sets. The lower the energy cost of the fracturing pump set, the higher the priority of the fracturing pump set, and the earlier the fracturing pump set is turned on; the higher the energy cost of the fracturing pump set, the lower the priority of the fracturing pump set, and the later the fracturing pump set is turned on. The priority of each fracturing pump set may be stored in the fracturing control device 101 of the fracturing system.

For example, among the three driving modes of diesel driven, electric driven, and turbine driven, the energy cost of diesel driven is the lowest. Therefore, the diesel-driven fracturing pump set has the highest priority, and after the fracturing operation begins, the diesel-driven fracturing pump set will be used first.

Figure 2:
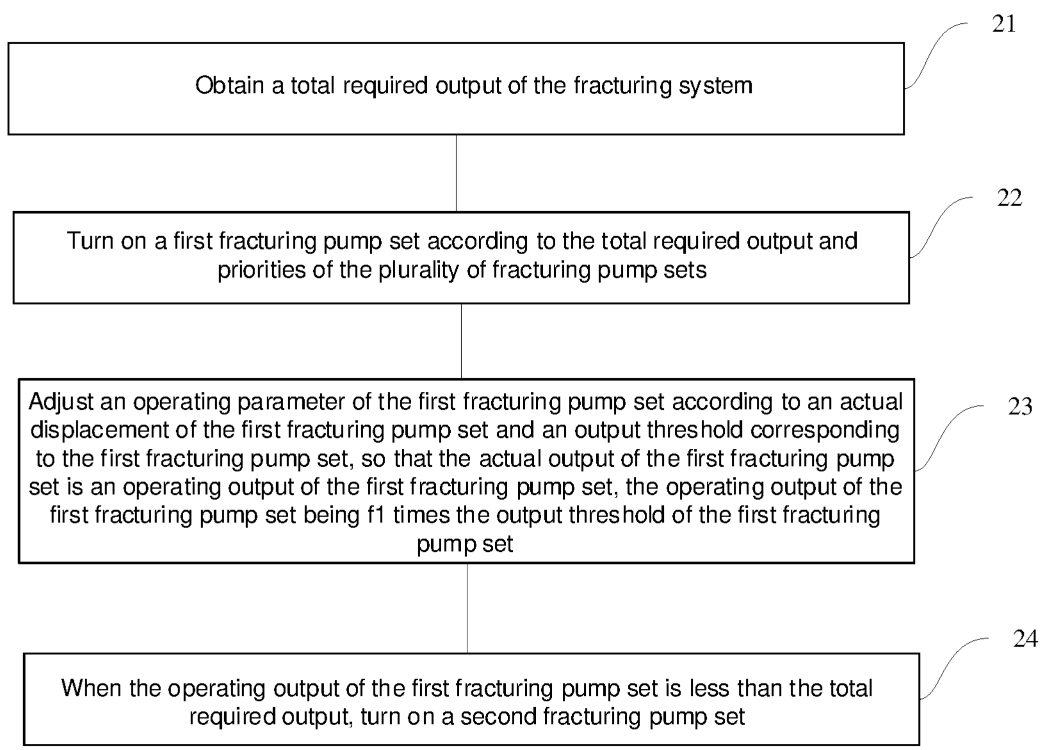
FIG. 2 is a block diagram of a fracturing control method, in accordance with some embodiments.

Some embodiments of the present disclosure provide a fracturing control method, which may be applied to the fracturing system 100 shown in FIG. 1. The fracturing system 100 includes a first fracturing pump set 201 and a second fracturing pump set 202. A priority of the second fracturing pump set 202 is lower than a priority of the first fracturing pump set 201. As shown in FIG. 2, the fracturing control method includes the following steps.

In step 21, a total required output of the fracturing system is obtained.

The total required output may be the output required in each operation. Before each operation begins, the total required output may be calculated according to different operation sites and operation stages. Alternatively, the total required output of a current operation may be set by the user and then stored in the fracturing control device 101.

In step 22, a first fracturing pump set 201 is turned on according to the total required output and priorities of the plurality of fracturing pump sets.

For example, the first fracturing pump set 201 may be the fracturing pump set with the highest priority among the plurality of fracturing pump sets, or may be any fracturing pump set with a priority between the highest priority and the lowest priority among the plurality of fracturing pump sets. The following embodiments will be described by taking an example where the first fracturing pump set 201 is the fracturing group with the highest priority among the plurality of fracturing pump sets.

In some embodiments, when the fracturing operation begins, the first fracturing pump set 201 with the highest priority in the fracturing system 100 is turned on first. Turning on the first fracturing pump set 201 includes simultaneously turning on M fracturing pumps in the first fracturing pump set 201, or sequentially turning on each fracturing pump in the first fracturing pump set 201.

For example, an interval time is set in advance, and when the first fracturing pump set 201 is turned on, a single fracturing pump in the first fracturing pump set 201 is turned on every such interval time. The interval time may be set according to the operation site and operation stage. For another example, when the first fracturing pump set 201 is turned on, any fracturing pump (e.g., a fracturing pump 2011) in the first fracturing pump set 201 is turned on, and after an actual output of the fracturing pump 2011 reaches the output threshold corresponding to the fracturing pump 2011, another fracturing pump (e.g., a fracturing pump 2012) in the first fracturing pump set 201 is turned on. The present disclosure does not limit how the M fracturing pumps in the first fracturing pump set 201 are turned on. The following embodiments will be described by taking an example where the M fracturing pumps in the first fracturing pump set 201 are turned on simultaneously.

In step 23, an operating parameter of the first fracturing pump set 201 is adjusted according to an actual output of the first fracturing pump set 201 and an output threshold corresponding to the first fracturing pump set 201, so that the actual output of the first fracturing pump set 201 is an operating output of the first fracturing pump set 201, the operating output of the first fracturing pump set 201 being f1 times the output threshold of the first fracturing pump set 201.

For example, if the M fracturing pumps in the first fracturing pump set 201 are simultaneously turned on in step 22, the output threshold corresponding to the first fracturing pump set 201 is the sum of the output thresholds of the M fracturing pumps in the first fracturing pump set 201, and the output threshold of each fracturing pump set may be stored in the fracturing control device 101. For example, the output thresholds of the fracturing pump 2011, the fracturing pump 2012, . . . , and the fracturing pump 201M in the first fracturing pump set 201 are D2011, D2012, . . . , and D201M in sequence; then, the output threshold X1 of the first fracturing pump set 201 is the sum of D2011, D2012, . . . , and D201M (X1=D2011+D2012++D201M). The actual output of the first fracturing pump set 201 is the sum of the actual outputs of the M fracturing pumps in the first fracturing pump set 201. For example, the actual outputs of the fracturing pump 2011, the fracturing pump 2012, . . . , and the fracturing pump 201M in the first fracturing pump set 201 are Q2011, Q2012, . . . , and Q201M in sequence; then, the actual output Y1 of the first fracturing pump set 201 is the sum of Q2011, Q2012, . . . , and Q201M (Y1=Q2011+Q2012+ . . . +Q201M).

The output threshold of each fracturing pump in the first fracturing pump set 201 is related to rated parameters, for example, the rated power, of the fracturing pump. According to the rated parameters and actual operation conditions of each fracturing pump in the first fracturing pump set 201, the output thresholds of the M fracturing pumps in the first fracturing pump set 201 may be set to the same value or different values.

For example, the first fracturing pump set 201 includes a fracturing pump that has been used for a long time, and some components in the fracturing pump that has been used for a long time may have aged. Therefore, the output threshold of this fracturing pump may set to be lower than the output thresholds of the other fracturing pumps. The output threshold of each fracturing pump may be set in advance, or may be calculated according to the actual operation conditions of the fracturing pump. The output threshold of each fracturing pump is not limited in the present disclosure.

In some embodiments, if the actual output of the first fracturing pump set 201 is greater than or equal to the output threshold corresponding to the first fracturing pump set 201, the operating parameter of the first fracturing pump set will be adjusted, so that the operating output of the first fracturing pump set is f1 times the output threshold. Herein, f1 is greater than or equal to 0.8 and less than 1 (0.8 f1<1).

If the actual output Y1 of the first fracturing pump set 201 is greater than or equal to the output threshold X1 corresponding to the first fracturing pump set 201, it means that the actual output of the first fracturing pump set 201 has exceeded or is about to exceed the preset output threshold corresponding to the first fracturing pump set 201. At this time, if the operating output of the first fracturing pump set 201 is not reduced, the fracturing pumps in the first fracturing pump set 201 may be overloaded, which may cause damages to the fracturing pumps. The operating output of the first fracturing pump set 201 may be a requirement on the output of the first fracturing pump set 201 during operation, and the operating output of the first fracturing pump set 201 may be adjusted by adjusting the operating parameters of the first fracturing pump set 201.

Considering the operating output Z1 of the first fracturing pump set 201 as an example, if the operating output Z1 of the first fracturing pump set 201 exceeds the output threshold X1 corresponding to the first fracturing pump set 201, the first fracturing pump set 201 may be overloaded. By adjusting the operating parameters of the first fracturing pump set 201, the operating output Z1 of the first fracturing pump set 201 may be reduced, so that the operating output Z1 of the first fracturing pump set 201 is maintained at f1 times the output threshold. That is, Z1 is equal to f1 times X1 (Z1=f1*X1), and f1 is greater than or equal to 0.8 and less than 1 (0.8≤f1<1). In this way, it may be possible to ensure a high actual output of the first fracturing pump set 201 while ensuring the normal operation of the first fracturing pump set 201.

In step 24, if the operating output of the first fracturing pump set 201 is less than the total required output, a second fracturing pump set 202 is turned on.

Figure 3:
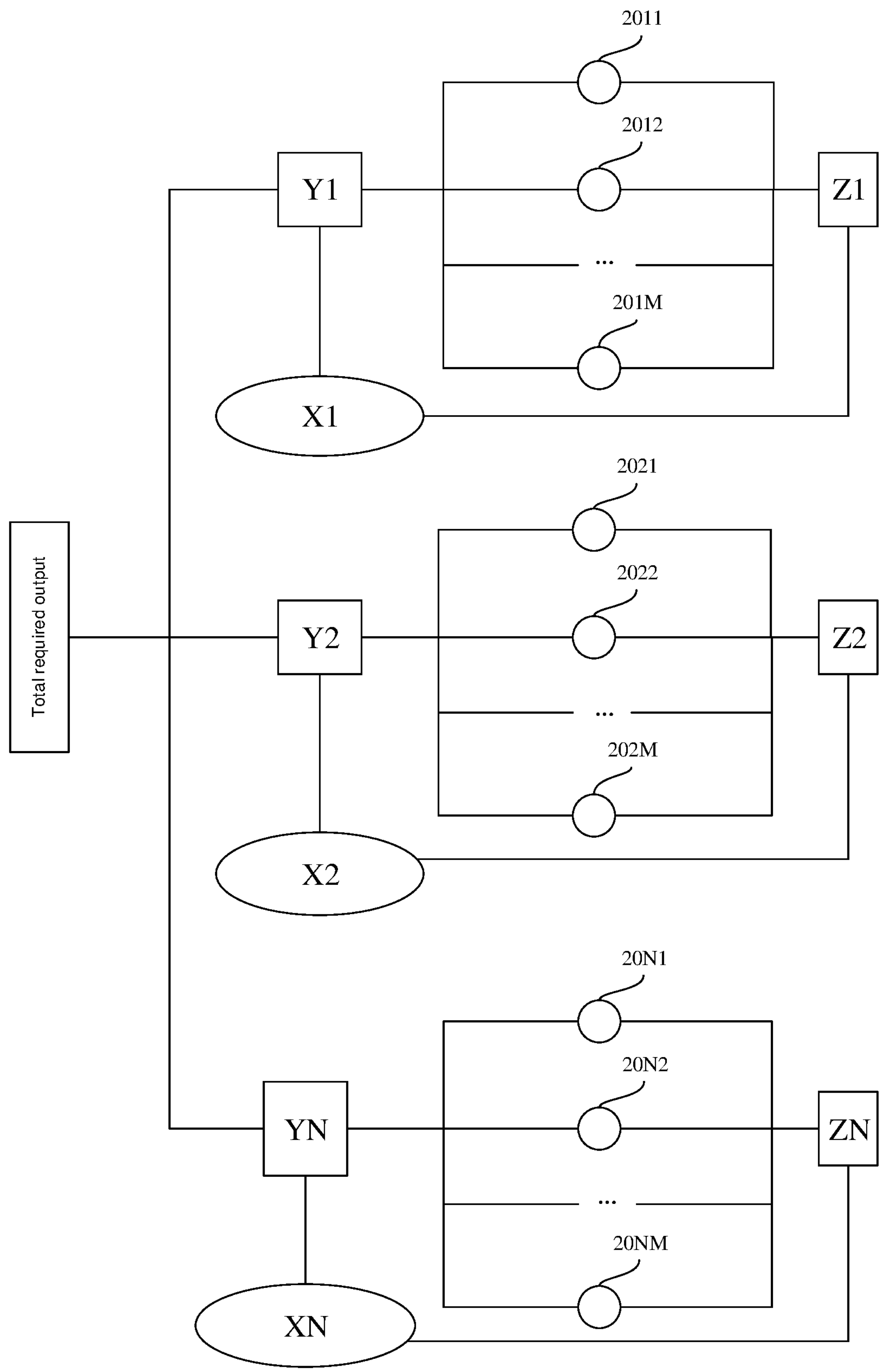
FIG. 3 is a block diagram of another fracturing control method, in accordance with some embodiments.

As shown in FIG. 3, since the operating output Z1 of the first fracturing pump set 201 is a requirement on the output of the first fracturing pump set 201 during operation, in step 23, after the operating output Z1 of the first fracturing pump set 201 reaches f1 times the output threshold X1, the actual output of the first fracturing pump set 201 may be lower than the operating output Z1 of the first fracturing pump set 201. If the operating output Z1 of the first fracturing pump set 201 is less than the total required output, it means that the actual output of the first fracturing pump set 201 is less than the total required output. In order to reach the total required output, a fracturing pump set with a priority lower than the priority of the first fracturing pump set 201, for example, the second fracturing pump set 202, needs to be turned on. If the priority of the first fracturing pump set 201 is the highest priority, the priority of the second fracturing pump set 202 is the second highest priority.

In some embodiments, the fracturing control method further includes: obtaining a sum of actual outputs of fracturing pump sets in an on state; and if the sum of the actual outputs of the fracturing pump sets in the on state is greater than or equal to the total required output, no longer turning on a fracturing pump set in an off state.

In some embodiments, if the sum of the actual outputs of the fracturing pump sets in the on state is less than the total required output, it means that the fracturing pump set currently in the on state cannot meet the requirements of the current operation site and operation stage. Therefore, a fracturing pump set in the off state needs to be turned on.

For example, if the fracturing pump sets in the on state are the first fracturing pump set 201 and the second fracturing pump set 202, and the sum of the actual output of the first fracturing pump set 201 and the actual output of the second fracturing pump set 202 is less than the total required output, in order to meet the total required output, a fracturing pump set in the off state needs to be turned on. For example, steps 22 to 24 may be repeated multiple times, until the sum of the actual outputs of the fracturing pump sets in the on state is greater than or equal to the total required output. In one embodiment, if steps 22 to 24 are repeated multiple times, then step 24 may be: if a sum of the operating output(s) of the fracturing pump set(s) in the on state is less than the total required output, turning on the fracturing pump set with the highest priority in the fracturing pump sets in the off state. For example, as shown in FIG. 3, the N fracturing pump sets are all in the on state, and the sum of the actual outputs of the N fracturing pump sets is equal to the total required output.

In some embodiments, if the sum of the actual outputs of the fracturing pump sets in the on state is greater than the total required output, it means that the fracturing pump sets currently in the on state meet the requirements of the current operation site and operation stage. Therefore, there is no need to turn on a fracturing pump set(s) in the off state. For example, if the fracturing pump sets in the on state are the first fracturing pump set 201 with the highest priority and the second fracturing pump set 202 with the second highest priority, and the sum of the actual output of the first fracturing pump set 201 and the actual output of the second fracturing pump set 202 is greater than or equal to the total required output, it means that the first fracturing pump set 201 and the second fracturing pump set 202 are able to meet the requirements of the current operation site and operation stage, and there is no need to turn on a fracturing pump set with a priority lower than the priority of the second fracturing pump set 202.

In some embodiments, the control method further includes: obtaining an amount of energy consumed by fracturing pump(s) that are turned on in the first fracturing pump set 201; and if the amount of energy consumed by the fracturing pump(s) that are turned on in the first fracturing pump set 201 is greater than or equal to an energy threshold corresponding to the first fracturing pump set 201, turning off the fracturing pump(s) that are turned on in the first fracturing pump set 201. For example, the energy threshold may be set according to the total amount of energy at the operation site. Considering an example where the first fracturing pump set 201 is diesel-driven and the total amount of diesel at the operation site is 10 tons, in different operation stages, the energy threshold of the first fracturing pump set 201 may be set to 10 tons of diesel oil or less, and the energy threshold of each fracturing pump set may be stored in the fracturing control device 101. For example, if the energy threshold of the first fracturing pump set is set to 5 tons, then the energy threshold of the first fracturing pump set may be stored in the fracturing control device 101 as 5 tons. The present disclosure does not limit the method of setting the energy threshold and the specific value of the set energy threshold.

In some embodiments, if the amount of energy consumed by M fracturing pumps in the first fracturing pump set 201 is greater than or equal to the energy threshold corresponding to the first fracturing pump set 201, it means that the driving mode corresponding to the first fracturing pump set 201 cannot continue to use the energy required by the driving mode. Therefore, at least one fracturing pump that is turned on in the first fracturing pump set 201 needs to be turned off. Moreover, if the energy threshold corresponding to the first fracturing pump set 201 is the total amount of energy at the operation site, regardless of the priority of the first fracturing pump set 201, in a case where the energy required by the driving mode corresponding to the first fracturing pump set 201 is not supplemented, any fracturing pump in the first fracturing pump set 201 will no longer be turned on.

In some embodiments, for any fracturing pump set that is turned on in the N fracturing pump sets, if the amount of energy consumed by the fracturing pump(s) that are turned on in the fracturing pump set is greater than or equal to the energy threshold corresponding to the fracturing pump set, then the fracturing pump(s) that are turned on in the fracturing pump set are turned off.

With the fracturing control method described in the above embodiments, it may be possible to achieve that the plurality of fracturing pump sets are automatically turned on and turned off on a premise that the operation requirements are met.

Some embodiments of the present disclosure further provide a fracturing system. As shown in FIG. 1, the fracturing system may be a fracturing system 100, and the fracturing system 100 includes the fracturing control device 101 and a plurality of fracturing pump sets (e.g., the fracturing pump set 201, the fracturing pump set 202, . . . , and the fracturing pump set 20N in FIG. 1). Among the plurality of fracturing pump sets, each fracturing pump set includes a plurality of fracturing pumps (e.g., the fracturing pump set 201 includes the fracturing pump 2011, the fracturing pump 2012, . . . , and the fracturing pump 201M). The fracturing control device 101 is coupled to the plurality of fracturing pump sets to control the on and off states of the plurality of fracturing pump sets. A coupling manner between the fracturing control device 101 and the N fracturing pump sets may be that the fracturing control device 101 is coupled to the controller of each fracturing pump set, or may be that the fracturing control device 101 is coupled to the controller of each fracturing pump in each fracturing pump set. The coupling manner between the fracturing control device 101 and the plurality of fracturing pump sets is not limited in the present disclosure.

In some embodiments, the fracturing control device 101 is configured to obtain the total required output. The total required output may be the output required in each operation. Before each operation begins, the total required output may be calculated according to different operation sites and operation stages. Alternatively, the total required output of the current operation may be set by the user and then stored in the fracturing control device 101.

In some embodiments, the fracturing control device 101 is further configured to turn on a first fracturing pump set according to the total required output and priorities of the plurality of fracturing pump sets.

In some embodiments, the fracturing control device 101 is further configured to set a priority of each fracturing pump set according to an energy cost of each fracturing pump set in the plurality of fracturing pump sets. Different fracturing pump sets in the plurality of fracturing pump sets have different priorities, and the priority of each fracturing pump set may be set according to the energy cost of the fracturing pump set. This priority is used to determine the order of turning on the plurality of fracturing pump sets. The lower the energy cost of the fracturing pump set, the higher the priority of the fracturing pump set, and the earlier the fracturing pump set is turned on; the higher the energy cost of the fracturing pump set, the lower the priority of the fracturing pump set, and the later the fracturing pump set is turned on. The priority of each fracturing pump set may be stored in the fracturing control device 101 of the fracturing system.

In some embodiments, an energy cost of the first fracturing pump set is lower than an energy cost of the second fracturing pump set.

In some embodiments, the fracturing control device 101 is further configured to adjust an operating parameter of the first fracturing pump set according to an actual output of the first fracturing pump set and an output threshold corresponding to the first fracturing pump set, so that the actual output of the first fracturing pump set is an operating output, and the operating output is f1 times the output threshold. The output threshold of each fracturing pump set may be stored in the fracturing control device 101 in advance.

In some embodiments, the fracturing control device 101 is configured to: if the actual output of the first fracturing pump set is greater than or equal to the output threshold corresponding to the first fracturing pump set, adjust the operating parameter of the first fracturing pump set, so that the actual output of the first fracturing pump set is an operating output, and the operating output is f1 times the output threshold, f1 being greater than or equal to 0.8 and less than 1 ($0.8 \leq f1 < 1$).

In some embodiments, the fracturing control device 101 is further configured to: if the operating output of the first fracturing pump set is less than the total required output, turn on a second fracturing pump set. The plurality of fracturing pump sets include the first fracturing pump set and the second fracturing pump set, and a priority of the second fracturing pump set is lower than a priority of the first fracturing pump set.

In some embodiments, the fracturing control device 101 is further configured to: obtain a sum of actual outputs of fracturing pump sets in an on state; and if the sum of the actual outputs of the fracturing pump sets in the on state is greater than or equal to the total required output, no longer turn on a fracturing pump set in an off state.

In some embodiments, the first fracturing pump set includes a plurality of fracturing pumps, and the fracturing control device 101 is further configured to: obtain an amount of energy consumed by fracturing pump(s) that are turned on in the first fracturing pump set; and if the amount of energy consumed by the fracturing pump(s) that are turned on in the first fracturing pump set is greater than or equal to an energy threshold corresponding to the first fracturing pump set, turn off the fracturing pump(s) that are turned on in the first fracturing pump set. The output threshold of each fracturing pump set may be stored in the fracturing control device 101 in advance.

With the fracturing system described in the above embodiments, it may be possible to achieve that the plurality of fracturing pump sets are automatically turned on and turned off on a premise that the fracturing system meets the operation requirements.

Some embodiments of the present disclosure provide a non-transitory computer-readable storage medium. The non-transitory computer-readable storage medium has stored thereon computer program instructions that, when run on a computer (e.g., a fracturing system), cause the computer to perform the fracturing control method as described in any one of the above embodiments.

For example, the non-transitory computer-readable storage medium includes, but is not limited to: a magnetic storage device (e.g., a hard disk, a floppy disk, or a magnetic tape), an optical disk (e.g., a compact disk (CD), a digital versatile disk (DVD)), a smart card and a flash memory device (e.g., an erasable programmable read-only memory (EPROM), a card, a stick or a key drive). Various computer-readable storage media described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure further provide a computer program product. The computer program product includes computer program instructions stored on a non-transitory computer-readable storage medium. When executed on a computer (e.g., a fracturing system), the computer program instructions cause the computer to perform the fracturing control method as described in any one of the above embodiments.

Some embodiments of the present disclosure further provide a computer program. When executed on a computer (e.g., a fracturing system), the computer program causes the computer to perform the fracturing control method as described in any one of the above embodiments.

Beneficial effects of the non-transitory computer-readable storage medium, the computer program product and the computer program are the same as the beneficial effects of the fracturing control method as described in some of the above embodiments, and details will not be repeated here.

The foregoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A fracturing control method applied to a fracturing system, the fracturing system comprising a plurality of fracturing pump sets, the method comprising:

turning on a first fracturing pump set of the plurality of fracturing pump sets according to a total required output of the fracturing system;

adjusting an operating parameter of the first fracturing pump set according to an actual output of the first fracturing pump set and an output threshold corresponding to the first fracturing pump set, so that the actual output of the first fracturing pump set is an operating output, the operating output being f1 times the output threshold, wherein f1 is a number;

when the operating output of the first fracturing pump set is less than the total required output, turning on a second fracturing pump set of the plurality of fracturing pump sets, and a priority of turning on the second fracturing pump set being lower than a priority of turning on the first fracturing pump set;

obtaining an amount of energy consumed by at least one fracturing pump that is turned on in the first fracturing pump set; and when the amount of energy consumed by the at least one fracturing pump that is turned on in the first fracturing pump set is greater than or equal to an energy threshold corresponding to the first fracturing pump set, turning off the at least one fracturing pump that is turned on in the first fracturing pump set.

2. The fracturing control method according to claim 1, wherein:

each fracturing pump set includes a plurality of fracturing pumps; and turning on the first fracturing pump set comprises:

simultaneously turning on the plurality of fracturing pumps in the first fracturing pump set, or sequentially turning on each fracturing pump in the first fracturing pump set.

3. The fracturing control method according to claim 1, wherein adjusting the operating parameter of the first fracturing pump set according to the actual output of the first fracturing pump set and the output threshold corresponding to the first fracturing pump set comprises:

when the actual output of the first fracturing pump set is greater than or equal to the output threshold corresponding to the first fracturing pump set, adjusting the operating parameter of the first fracturing pump set, so that the actual output of the first fracturing pump set is the operating output, the operating output being f1 times the output threshold, and f1 being greater than or equal to 0.8 and less than 1.

4. The fracturing control method according to claim 1, further comprising:

obtaining a sum of actual outputs of at least one fracturing pump set in an on state in the plurality of fracturing pump sets; and when the sum of the actual outputs of the at least one fracturing pump set in the on state is greater than or equal to the total required output, ceasing turning on any fracturing pump set that is in an off state.

5. The fracturing control method according to claim 1, further comprising:

setting a priority of each fracturing pump set according to an energy cost of each fracturing pump set in the plurality of fracturing pump sets.

6. The fracturing control method according to claim 5, wherein different fracturing pump sets in the plurality of fracturing pump sets have different priorities for turning on.

7. The fracturing control method according to claim 6, wherein:

the priorities are used to determine an order of turning on the plurality of fracturing pump sets; and any fracturing pump set of the plurality of fracturing pump sets with a lower energy cost has a higher priority and is turned on earlier.

8. The fracturing control method according to claim 1, wherein:

an energy cost of the first fracturing pump set is lower than an energy cost of the second fracturing pump set.

9. A non-transitory computer-readable storage medium storing computer program instructions that, when executed by a computer, cause the computer to perform operations comprising:

turning on a first fracturing pump set of a plurality of fracturing pump sets according to a total required output of a fracturing system, the fracturing system comprising the plurality of fracturing pump sets;

adjusting an operating parameter of the first fracturing pump set according to an actual output of the first fracturing pump set and an output threshold corresponding to the first fracturing pump set, so that the actual output of the first fracturing pump set is an operating output, the operating output being f1 times the output threshold, wherein f1 is a number;

when the operating output of the first fracturing pump set is less than the total required output, turning on a second fracturing pump set of the plurality of fracturing pump sets, and a priority of turning on the second fracturing pump set being lower than a priority of turning on the first fracturing pump set;

obtaining an amount of energy consumed by at least one fracturing pump that is turned on in the first fracturing pump set; and when the amount of energy consumed by the at least one fracturing pump that is turned on in the first fracturing pump set is greater than or equal to an energy threshold corresponding to the first fracturing pump set, turning off the at least one fracturing pump that is turned on in the first fracturing pump set.

10. The non-transitory computer-readable storage medium according to claim 9, wherein adjusting the operating parameter of the first fracturing pump set according to the actual output of the first fracturing pump set and the output threshold corresponding to the first fracturing pump set comprises:

when the actual output of the first fracturing pump set is greater than or equal to the output threshold corresponding to the first fracturing pump set, adjusting the operating parameter of the first fracturing pump set, so that the actual output of the first fracturing pump set is the operating output, the operating output being f1 times the output threshold, and f1 being greater than or equal to 0.8 and less than 1.

11. The non-transitory computer-readable storage medium according to claim 9, wherein the operations further comprise:

setting a priority of each fracturing pump set according to an energy cost of each fracturing pump set in the plurality of fracturing pump sets.

12. The non-transitory computer-readable storage medium according to claim 11, wherein different fracturing pump sets in the plurality of fracturing pump sets have different priorities for turning on.

13. A fracturing system, comprising:

a plurality of fracturing pump sets; and a fracturing control device coupled to the plurality of fracturing pump sets, wherein the fracturing control device is configured to:

turn on a first fracturing pump set of the plurality of fracturing pump sets according to a total required output of the fracturing system;

adjust an operating parameter of the first fracturing pump set according to an actual output of the first fracturing pump set and an output threshold corresponding to the first fracturing pump set, so that the actual output of the first fracturing pump set is an operating output, the operating output being f1 times the output threshold, wherein f1 is a number;

when the operating output of the first fracturing pump set is less than the total required output, turn on a second fracturing pump set of the plurality of fracturing pump sets, and a priority of turning on the second fracturing pump set being lower than a priority of turning on the first fracturing pump set;

obtain an amount of energy consumed by at least one fracturing pump that is turned on in the first fracturing pump set; and when the amount of energy consumed by the at least one fracturing pump that is turned on in the first fracturing pump set is greater than or equal to an energy threshold corresponding to the first fracturing pump set, turn off the at least one fracturing pump that is turned on in the first fracturing pump set.

14. The fracturing system according to claim 13, wherein:

each fracturing pump set includes a plurality of fracturing pumps; and the fracturing control device is further configured to:

simultaneously turn on the plurality of fracturing pumps in the first fracturing pump set, or sequentially turn on each fracturing pump in the first fracturing pump set.

15. The fracturing system according to claim 13, wherein the fracturing control device is configured to:

when the actual output of the first fracturing pump set is greater than or equal to the output threshold corresponding to the first fracturing pump set, adjust the operating parameter of the first fracturing pump set, so that the actual output of the first fracturing pump set is the operating output, the operating output being f1 times the output threshold, and f1 being greater than or equal to 0.8 and less than 1.

16. The fracturing system according to claim 13, wherein the fracturing control device is further configured to:

obtain a sum of actual outputs of at least one fracturing pump set in an on state in the plurality of fracturing pump sets; and when the sum of the actual outputs of the at least one fracturing pump set in the on state is greater than or equal to the total required output, cease turning on any fracturing pump set that is in an off state.

17. The fracturing system according to claim 13, wherein the fracturing control device is further configured to: set a priority of each fracturing pump set according to an energy cost of each fracturing pump set in the plurality of fracturing pump sets.

18. The fracturing system according to claim 17, wherein different fracturing pump sets in the plurality of fracturing pump sets have different priorities for turning on.

19. The fracturing system according to claim 18, wherein:

the priorities are used to determine an order of turning on the plurality of fracturing pump sets; and any fracturing pump set of the plurality of fracturing pump sets with a lower energy cost has a higher priority and is turned on earlier.

20. The fracturing system according to claim 13, wherein an energy cost of the first fracturing pump set is lower than an energy cost of the second fracturing pump set.

* * * * *